Patented Sept. 2, 1947

2,426,634

UNITED STATES PATENT OFFICE 2,426,634

COMPOSITION AND METHOD

Daniel Melnick, New York, N. Y., assignor to Continental Foods, Inc., Hoboken, N. J., a corporation of Illinois No Drawing. Application May 29, 1943, Serial No. 489,059

9 Claims. (Cl. 99—124)

This invention relates to treatment of concentrated food preparations and the like to inhibit changes therein producing unsightly discoloration and decomposition thereof, and is more specifically concerned with food concentrates and the like containing carbohydrates, particularly the sugars, and amino acids, particularly dicarboxylic amino acids and salts thereof typified by monosodium glutamate.

In the compounding of many concentrated foods, constituents of various kinds are blended together to achieve a finished product having a desired flavor. Some of these constituents may be relatively pure compounds or, at least substances of simple nature as compared with the corresponding components of foods prepared for consumption directly from natural raw food materials. As exemplary of such concentrated food compositions, commonly referred to as "mixes," reference is made to a soup mix consisting of a plastic mass adapted to form the stock of a finished soup, the mix being usually associated in packaging with a suitable proportion of noodles, dehydrated vegetables, or the like. In a typical soup mix this plastic composition was made up of the following ingredients in the proportions specified:

| | Per cent |
|---|---|
| Dextrose | 32 |
| Monosodium glutamate | 15 |
| Vegetable protein hydrolysate | 2 |
| Fats | 20 |
| Salt, spices, and other minor flavoring ingredients | 31 |

The above soup mix is selected for the purpose of exemplification of the invention and with a view to instructing others skilled in the art so that they may more readily and fully understand the principles of this invention and the practical application thereof and thus may be enabled to use the invention in numerous different kinds of food and with numerous modifications, each as may be best suited to the requirements of a particular use.

It has been found that the soup mix described above in common with other compositions containing ingredients of the same general nature as the amino acid materials and carbohydrates included in the soup mix, tend to change color and especially to form isolated black spots or "islands" or a general dark brown pigmentation of the entire mass. Comparison was made between a relatively fresh soup mix (about one month old) of the above type and a similar mix about ten months old. The former was a paste, light yellow in color while the latter was brown in color with numerous "islands" of brown-black pigment. It was definitely established that the coloring did not result from bacterial action or any other organic growth, and that the darkened mix was still suitable for use as a food; but the pigmentation, nevertheless, was such as to render the mix less appetizing, and may have reduced vitamin value.

It is accordingly a primary object of the present invention to remove or correct the causes of the said pigmentation and especially to provide means for the inhibition and control of the concomitant chemical reactions.

It is a further object of the invention to improve the keeping qualities of concentrated food mixes containing amino acid material and carbohydrate material without impairment of flavor, vitamin potency or capacity for simple and rapid dehydration.

Although darkening of food products has been observed and known for a very long time, its causes have not been generally recognized. In some cases, it has been shown to be due to enzymic action; in some cases, it has been attributed to oxidation or caramelization occurring during drying operations; in other cases, it has been reported that darkening is due to reactions of substances in the food with metal salts in the water with which the food is mixed or treated; and in still other cases, it appears that darkening is due to a reaction between a sugar and an amino acid. The product of the latter reaction has been produced experimentally, and comparative studies indicate that this experimentally produced pigment corresponds to that normally formed in the soup mix and like dehydrated food products during storage.

In all cases where a pigment was produced in the experimental samples, said samples contained both an amino acid material and a carbohydrate material with at least traces of water and the reaction occurred in the presence of oxygen. These I have determined to be the constituents necessary to the reaction. The designations "amino acid material" and "carbohydrate material" are used advisedly. The former term includes salts and other compositions which may be derived from amino acids wherein the amino acid structure is present. Similarly, "carbohydrate material" is employed to designate compositions having the general basic structure and showing the general properties of sugars or such as to be converted to sugars in some degree during processing or storage. The manner in which these terms are used will also be apparent from the further discussion of the invention herein.

The darkening noted above is clearly non-enzymic in nature, although in some instances it may involve enzymic conversion of starch to more highly reactive sugars. The pigment is clearly different from that produced in foods by active enzymes.

Referring back to the samples which were stored under controlled conditions designed to hasten the development of the undesirable pigmentation, certain additional generalizations can be made on the basis of studies conducted. In the specific compositions noted, monosodium glutamate and dextrose are among the most active amino acid materials and carbohydrate materials respectively which have been studied. In general, alkaline derivatives of the dicarboxylic mono amino acids and the sugars seem to be especially reactive. Further, it appears that the more alkaline the amino acid derivatives are, the more reactive they are; e. g. the disodium salts are more reactive than the monosodium salts and the latter more than the monoacid amides. Similarly the simpler carbohydrates, especially the mono-and di-saccharides, react more readily with amino acid materials to form pigmented bodies.

Referring again to the specific studies conducted on the soup mix specified above; pigment is formed more slowly and seemingly to a less extent in the absence of monosodium glutamate by reaction of the vegetable protein hydrolysate. Likewise, simple polysaccharides yield substantial pigmentation with amino acid materials but at a slower rate than the simple sugars, while the more complex starches react so slowly with most amino acids and the like as to render the pigmentation negligible over normal storage periods.

The invention contemplates inhibition of pigmentation in compositions of the type described above by inhibiting the reaction between amino acid materials and carbohydrate materials. In preferred embodiments of the invention, the reactants of one type are isolated from the reactants of the other type and/or the mass is rendered sufficiently acid to inhibit the undesired pigmentation reaction.

For example, in the soup mix described above, either the dextrose or the two amino acid materials may be isolated from the remainder of the mass. The material to be isolated may be enclosed in sheaths of a suitable substance such as methyl or ethyl cellulose, or fat or various combinations of these, or other materials which will readily dissolve or disperse when the mass is mixed with hot water or heated after dilution with water. A convenient expedient is to enclose or mix one type of reactant in or with the dry noodles packed with the mix containing the remainder of the ingredients described as making up the typical soup mix. In general the choice of isolating media and isolated reactants should be based on consideration of relative reactivities and anticipated maximum storage period.

By utilization of the invention herein disclosed, it is possible to prepare compositions such as concentrated soup mixes, and a wide variety of other dehydrated food preparations containing pigment-forming ingredients, which are very stable over normal or abnormal storage periods. As an alternative, or more advantageously in combination with such isolation, control of darkening over long storage periods is achieved by addition of an acid such that, in the presence of water sufficient to effect ionization it will have the effect of adjusting the pH to not substantially higher than 4.5. Where the medium, e. g. in the soup mix, is more acid than pH 4.5, substantial pigmentation of the type with which we are here concerned does not occur even though compositions including highly reactive amino acid materials and highly reactive carbohydrate materials are stored for long periods of time.

In many food compositions, pH below 4.5 is distastefully sour. Soups prepared from concentrated mixes of this acidity were found to be so sour as to mask the agreeable flavor intended in the mix described above. In instances where the sour taste is undesirable, means are provided by the present invention to neutralize the acid to a suitable pH (for example about 6.6 for soups). Sodium bicarbonate or other suitable base may advantageously be included in a potentially active form as by inclusion physically while isolated chemically in accordance with the above description for chemically isolating the potentially reactive sugars and amino acid material. In general, the acid used should be a solid and both acid and base must be non-toxic where the composition is intended for consumption as food. Inorganic acids may be used, for example, metaphosphoric acid and sodium bisulfate are suitable but in preparing foods the organic acids are found to be better suited to the purpose.

Thus, to the soup mix described above may be added sufficient dry citric acid to provide 1 to 2% of that agent in the finished mix. An amount of sodium bicarbonate to give the desired taste is added as granules coated with a suitable isolating medium such as ethyl cellulose. Incorporation or mixing of the base in or with the dry noodles is also satisfactory, and in such case the plastic mix of other ingredients may be isolated by coating with fat or other inert food material. With citric acid, I have found that 1.08 grams of anhydrous sodium bicarbonate is suitable for overcoming the objectionable acid taste of 1 gram of added citric acid, used as the crystalline monohydrate. Similarly, 0.9% citric acid with 12.5% monosodium glutamate and 2.5% disodium glutamate in isolated form makes a suitable stable soup mix. Good results are also obtained from use of gutamic acid and disodium glutamate, each in quantity equivalent to 7.5% monosodium glutamate, the disodium glutamate being isolated in accordance with this invention.

Good results have also been obtained by using glutamic acid instead of the monosodium salt in any desired proportions, with a suitable neutralizing agent, e. g. sodium carbonate or bicarbonate in isolated form.

Both ethyl cellulose and methyl cellulose have been used with satisfactory results in preparing isolated neutralizing agents to impart a palatable pH to stabilized soup mix having a pH below 4.5. Ordinary sodium bicarbonate of commerce was mixed with a solution of 50 grams of ethyl cellulose in 500 cc. of 95% ethyl alcohol, total of 100 grams of sodium bicarbonate being used. The alcohol was then removed by heating on a steam bath and the coated base ground to a powder (approximately 80 mesh). It was determined that 1.4 grams of the coated salt are equivalent to 1 gram of the salt before coating. Titration with hydrochloric acid indicates that the sodium bicarbonate is released slowly when the coated material is suspended in water at room temperature, or at refrigeration temperatures in the neighborhood of 5° C. for example, at 5° C., about one hour is required for complete extraction of the salt in acid solution. On the other hand, at 100° C., the temperature at which a soup is prepared from the soup mix, release of sodium bicarbonate is almost instantaneous.

The soup mixes, embodying my invention as described above, keep well under all expected conditions of storage and shipment. Even under artificially severe tests they retain well their color and quality. Thus, storing at an elevated temperature a commercial soup mix of the type described above and a similar soup mix to which had been added 1% citric acid and coated sodium bicarbonate equivalent to 1.08% NaHCO₃, after 16 hours storage at 55° C., showed general discoloration and dark brown "islands" in the unstabilized soup mix, whereas the soup mix containing citric acid suffered only very slight generalized browning not noticeable upon casual inspection. Upon preparing a soup from the stabilized soup mix, it was found to be of good taste, comparable in every respect to the soup from freshly prepared soup mix.

Under similar rigorous conditions of test, using glutamic acid as the acid preserving agent and disodium glutamate as the neutralizing agent, in amounts such that together they are equivalent to the monosodium glutamate of the standard mix described above (equivalent to 5% monosodium glutamate), the mix was found to withstand successfully the high temperature storage. In another case, the monosodium glutamate was reduced by 5.0 and equivalent amounts of disodium glutamate and glutamic acid were added, 2.5% of each were used. In each instance, the disodium salt was previously coated with ethyl cellulose in the manner described in connection with sodium bicarbonate. Both these modified mixes and a sample of the standard mix were stored in a humid atmosphere 18 hours at 55° C., followed by 24 hours at 37° C. The control mix showed general discoloration of considerable extent and dark brown "islands". Both stabilized mixes suffered only negligible discoloration.

It has also been found advantageous to coat the alkaline ingredient, e. g., individual granules of disodium glutamate, with a highly hydrogenated edible fat which remains solid under all conditions of practical storage. If the mix contains fat-soluble reactants, e. g. spices, which are incompatible with the base, it is desirable to add another coating of a water soluble material such as sugar or gelatin over the fat, and to assure protection of this layer against the darkening reaction it may contain citric or glutamic or other suitable acid. Soup mixes of the type described above are effectively protected against development of dark pigment when the glutamate content of the mix is one-half in the form of glutamic acid distributed, without any coating, in the mix and one-half in the form of disodium glutamate isolated by a coating of hydrogenated fat, or the latter with an additional coating of sugar or gelatin. The addition of some of the free glutamic acid in the final coating insures absolute segregation of the enclosed alkaline material from the other materials in the mix. It is important to point out that by my invention I am able to achieve the desired results by physical form and only minor chemical modification of the normal constituents of the mix and without adding any essentially foreign ingredients in the mix, and without affecting the relationship of one ingredient to another in the re-constituted soup. It is important also that, in all these examples, the material embodying my invention liberate the isolated ingredient only very slowly in water at room temperatures or under refrigeration, whereas at 100° C. this liberation of the base occurs instantaneously. When the monosodium glutamate is used as the base to be segregated, a simple coating with the hydrogenated fat suffices, since the pH of this salt is such that it does not affect other fat-soluble reactants, such as spices.

Many other types of concentrated foods than the soup mixes chosen above as examples are subject to darkening or decomposition and can be protected against such deterioration by my invention. Dehydrated vegetables have been observed to show the sugar amino acid reaction. As an example of this, dehydrated tomatoes which have been observed by chemical and physical studies to show this sugar amino acid reaction, have been effectively protected against browning by addition of citric acid in an uncoated form and a base, for example, sodium bicarbonate in the form of coated pellicles.

In some cases, it may be desirable for the preservation of unstable nutrients to maintain a substantial part of the dehydrated composition at a particular pH which is more alkaline than that in which the food is customarily consumed. It is then necessary to add an acid material to such ingredients just before consumption. This acid ingredient may be isolated according to my present invention, e. g., as pellicles coated by any of the procedures described above, and thus isolated, may be mixed with other ingredients in the same packages during storage, so that it is readily available for decreasing the pH to one compatible with good taste when the mix is reconstituted for consumption.

Although in the foregoing specification I have given various examples of my invention and have suggested certain modifications and alternatives, these are not intended to be exhaustive nor limiting of my invention, but on the contrary are selected and presented with a view to illustrating and explaining the invention, the principles thereof and the best manner of applying it in practical use in order that others skilled in the art may be enabled to practice the invention and apply it under various circumstances and in various ways, and with modifications, each as may be best suited to the conditions of a particular use.

I claim:

1. A food concentrate composition comprising a carbohydrate and an amino acid material which can react therewith to form dark pigment, with sufficient acid to maintain said composition at a pH less than 4.5, and an alkaline edible substance in proportion sufficient to react with said acid to give a palatable product of a pH substantially above 4.5, and an edible coating which segregates said alkaline substance from the other components under storage conditions and which disintegrates in boiling water, whereby such formation of dark pigment is inhibited without destroying the palatable quality of the edible product thus prepared from said composition.

2. A packaged food concentrate composition comprising a carbohydrate and an amino acid material which can react therewith to form dark pigment, with sufficient acid to maintain said carbohydrate amino acid material at a pH less than 4.5, and an alkaline edible substance in proportion sufficient to react with said acid to give a palatable product of a pH substantially above 4.5, and an edible coating segregating said alkaline substance from the carbohydrate amino acid mixture under storage conditions, but adapted to release the alkaline substance into said mixture by a treatment incident to the preparation of the composition for serving, whereby such formation of dark pigment is inhibited without destroying the palatable character of the edible product thus prepared from said composition.

3. A food composition comprising a sugar and an amino acid material which can react therewith to form dark pigment, with sufficient acid to maintain said composition at a pH less than 4.5, and an alkaline substance in proportion sufficient to react with said acid to give a palatable product of a pH substantially above 4.5, and an edible coating on said alkaline substance which under storage conditions segregates said alkaline substance from the other components, but which disintegrates in boiling water, whereby such formation of dark pigment is inhibited without destroying the palatable character of the edible product thus formed from said composition.

4. A food composition comprising free glutamic acid, a carbohydrate which can react therewith to form dark pigments, disodium glutamate and a coating on said disodium glutamate of an edible material which under storage conditions segregates said glutamate from the other components, but which disintegrates in boiling water, whereby such formation of dark pigment is inhibited without destroying the palatable character of the edible product thus prepared from said composition.

5. A food composition comprising free glutamic acid, a carbohydrate which can react therewith to form dark pigment and disodium glutamate, and a coating on said disodium glutamate of a cellulose ether, which under storage conditions segregates the disodium glutamate from the glutamic acid and which disintegrates in boiling water, whereby such formation of dark pigment is inhibited without destroying the palatable character of the edible product thus prepared from said composition.

6. A food composition as defined in claim 5 wherein the coating consists essentially of methyl cellulose.

7. A food composition as defined in claim 5 wherein the coating consists essentially of ethyl cellulose.

8. A food composition as defined in claim 4 wherein the coating consists essentially of a normally solid fat.

9. A food composition comprising monosodium glutamate and a carbohydrate which can react therewith to form dark pigment, and sufficient acid to maintain said composition at a pH less than 4.5, and an alkaline substance in proportion sufficient to react with said acid to give a palatable product of a pH substantially above 4.5, and an edible coating on said alkaline substance which, under storage conditions, segregates said alkaline substance from the other components but which disintegrates in boiling water, whereby the formation of dark pigment is inhibited without destroying the palatable character of the edible product thus prepared from said composition.

DANIEL MELNICK.

REFERENCES CITED

The following references are of record in the file of this patent:

UNITED STATES PATENTS

| Number | Name | Date |
|---|---|---|
| 2,278,466 | Musher | Apr. 7, 1942 |
| 1,829,431 | Allen | Oct. 27, 1931 |
| 1,286,904 | Atkinson | Dec. 10, 1918 |
| 1,680,865 | Fujii | Aug. 14, 1928 |

FOREIGN PATENTS

| Number | Country | Date |
|---|---|---|
| 13,723 | Great Britain | Sept. 26, 1907 |